US010697366B2

(12) United States Patent
Liu et al.

(10) Patent No.: US 10,697,366 B2
(45) Date of Patent: Jun. 30, 2020

(54) ROTARY ENGINE WITH AXIALLY DIRECTLY CONNECTED COMPRESSION AND POWER CYLINDERS

(71) Applicants: Nien-Tzu Liu, Nangang Dist. (TW);
Hsiao-Kang Ma, Taipei (TW);
Cheng-Chia Fang, New Taipei (TW);
Ta-Tung Cheng, Taipei (TW);
Cheng-Shen Chu, Taipei (TW)

(72) Inventors: Nien-Tzu Liu, Nangang Dist. (TW);
Hsiao-Kang Ma, Taipei (TW);
Cheng-Chia Fang, New Taipei (TW);
Ta-Tung Cheng, Taipei (TW);
Cheng-Shen Chu, Taipei (TW)

( * ) Notice: Subject to any disclaimer, the term of this patent is extended or adjusted under 35 U.S.C. 154(b) by 30 days.

(21) Appl. No.: 16/204,745

(22) Filed: Nov. 29, 2018

(65) Prior Publication Data

US 2020/0173355 A1    Jun. 4, 2020

(51) Int. Cl.
| *F02B 53/04* | (2006.01) |
| *F02B 53/06* | (2006.01) |
| *F02B 53/12* | (2006.01) |
| *F02B 55/08* | (2006.01) |
| *F02B 55/14* | (2006.01) |
| *F02B 55/16* | (2006.01) |
| *F01C 1/44* | (2006.01) |
| *F02B 55/02* | (2006.01) |

(52) U.S. Cl.
CPC ............... *F02B 55/16* (2013.01); *F01C 1/44* (2013.01); *F02B 53/04* (2013.01); *F02B 53/06* (2013.01); *F02B 53/12* (2013.01); *F02B 55/02* (2013.01); *F02B 55/08* (2013.01); *F02B 55/14* (2013.01); *F02B 2730/011* (2013.01)

(58) Field of Classification Search
CPC .......... F02B 53/04; F02B 53/06; F02B 55/08; F02B 55/14; F02B 55/16; F02B 2730/011; F01C 1/44
See application file for complete search history.

(56) References Cited

U.S. PATENT DOCUMENTS

| 4,548,171 | A | * | 10/1985 | Larson | .................... F01C 19/04 123/230 |
| 6,082,324 | A | * | 7/2000 | Liu | .......................... F01C 1/44 123/235 |
| 9,458,719 | B2 | * | 10/2016 | Liu | .......................... F01C 1/44 |

* cited by examiner

*Primary Examiner* — Audrey K Bradley
(74) *Attorney, Agent, or Firm* — WPAT, PC

(57) ABSTRACT

A rotary engine with axially directly connected compression and power cylinders is disclosed, which includes a compression cylinder, a power cylinder, an intermediate cylinder wall located between the compression and the power cylinder to serve as a common inner-end wall of the two cylinders, and a combustion chamber unit fixed to a circumferential surface of the intermediate cylinder wall, so that the rotary engine has axially directly connected compression and power cylinders. A compression-side and a power-side rotational valve are separately fitted in two recessed end surfaces of the intermediate cylinder wall. The compression-side and the power-side rotational valve are provided with three L-shaped first and second openings, respectively. Compressed air-fuel mixture in the compression cylinder flows through the L-shaped first openings into the combustion chamber, and high temperature high pressure gas generated after explosion in the combustion chamber unit flows through the L-shaped second openings into the power cylinder.

4 Claims, 5 Drawing Sheets

ROTARY ENGINE WITH AXIALLY DIRECTLY CONNECTED COMPRESSION AND POWER CYLINDERS

FIELD OF THE INVENTION

The present invention relates to a rotary engine, and more particularly, to a rotary engine with axially directly connected compression and power cylinders to enable more reasonably designed air-fuel mixture flow paths and more easily arranged cooling water passages in the rotary engine.

BACKGROUND OF THE INVENTION

U.S. Pat. No. 6,082,324 granted to the same inventor discloses a rotary internal combustion engine, which is a rotary engine including eccentric blade rotors. More specifically, the rotary internal combustion engine disclosed in the above-mentioned US patent includes a compression cylinder, a combustion chamber and a power cylinder. The compression cylinder and the power cylinder are internally provided with a compression rotor and a power rotor, respectively, which are fixedly mounted on the same one rotary shaft. The compression rotor and the power rotor respectively have three blades. When the rotary shaft rotates, the compression rotor compresses air in the compression cylinder and pushes the compressed air into the combustion chamber, in which the compressed air is ignited and exploded to generate expanded high-temperature and high-pressure gas. The expanded gas is sent into the power cylinder to move the blades in the power cylinder and accordingly drives the rotary shaft to rotate. For the above-described rotary engine to operate in a smoother manner, the same inventor has further developed some related techniques, which have been granted U.S. Pat. No. 9,458,719 entitled "Rotor Assembly for Rotary Internal Combustion Engine".

However, according to U.S. Pat. No. 9,458,719, the rotary engine disclosed has a combustion chamber arranged between an intake-compression chamber and an exhaust-power chamber, such that the intake-compression chamber is located at a distance from the exhaust-power chamber to result in a somewhat big volume of the entire rotary engine. Further, in the rotary engine disclosed in U.S. Pat. No. 9,458,719, with the combustion chamber being arranged between the intake-compression chamber and the exhaust-power chamber, cylinder walls of the intake-compression chamber and the exhaust-power chamber become two independent units without being directly connected to each other, and the torsional moment produced when rotor assemblies provided in the intake-compression chamber and the exhaust-power chamber operate in the cylinder walls must be borne by pins fixed on outer parts of the cylinder walls. Also, the two not-directly-connected intake-compression chamber and exhaust-power chamber increase the structural complexity of the whole rotary engine and the difficulty in arranging cooling water passages in the cylinder walls. It is therefore tried by the same inventor to further develop an improved rotary engine with axially directly connected compression and power cylinders that includes a compression cylinder, an intermediate cylinder wall and a power cylinder that are axially arranged and sequentially connected together, enabling easy, straight-through and effective cooling water passages arrangement in the rotary engine.

SUMMARY OF THE INVENTION

A primary object of the present invention is to provide a rotary engine with axially directly connected compression and power cylinders, which changes the conventional structure and arrangement of a combustion chamber in a typical rotary engine and provides differently designed air-fuel mixture flow paths in a compression-side rotational valve and a power-side rotational valve of the present rotary engine, so as to reduce an overall volume of the rotary engine and enable easy arrangement of cooling water passages in the rotary engine.

Another object of the present invention is to provide a rotary engine, which includes an intermediate cylinder wall to serve as a common inner-end wall or a coupling unit of a compression cylinder and a power cylinder of the rotary engine, so as to further reduce an overall volume of the rotary engine.

To achieve the above and other objects, the rotary engine according to the present invention includes a compression cylinder, a power cylinder, an intermediate cylinder wall, and a combustion chamber unit. The intermediate cylinder wall is located between the compression cylinder and the power cylinder to serve as a common inner-end wall of the compression cylinder and the power cylinder. A compression-side rotational valve and a power-side rotational valve are separately fitted in two recessed end surfaces of the intermediate cylinder wall. The compression-side rotational valve is provided with three L-shaped first openings, which are located corresponding to three blades of a compression rotor in the compression cylinder and respectively have an outlet located on a circumferential wall of the compression-side rotational valve. The power-side rotational valve is provided with three L-shaped second openings, which are located corresponding to three blades of a power rotor in the power cylinder and respectively have an outlet located on a circumferential wall of the power-side rotational valve. The intermediate cylinder wall is provided on a circumferential surface with a first through hole and a second through hole. The first through hole is located within a rotational orbit of the outlets of the first openings, and the second through hole is located within a rotational orbit of the outlets of the second openings.

The combustion chamber unit is fixedly connected to the circumferential surface of the intermediate cylinder wall and internally defines a hollow combustion chamber. The combustion chamber communicates with the first through hole and the second through hole, such that compressed air-fuel mixture in the compression cylinder can sequentially flow through two aligned L-shaped first opening and first through hole into the combustion chamber and high temperature high pressure gas in the combustion chamber can sequentially flow through two aligned second through hole and L-shaped second opening into the power cylinder.

The combustion chamber unit includes a base and a hood. The base is fixed to the intermediate cylinder wall and is provided with a third through hole and a fourth through hole, which communicate with the first through hole and the second through hole on the intermediate cylinder wall, respectively. The hood internally defines the combustion chamber, which has an open side facing toward the base, and is fixedly connected to the intermediate cylinder wall to locate over and tightly press against the base, and the base closes the open side of the combustion chamber.

The intermediate cylinder wall is provided at one side of its circumferential surface with a recessed area, and the base of the combustion chamber unit is fixed to and located in the recessed area.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

Figure 1:
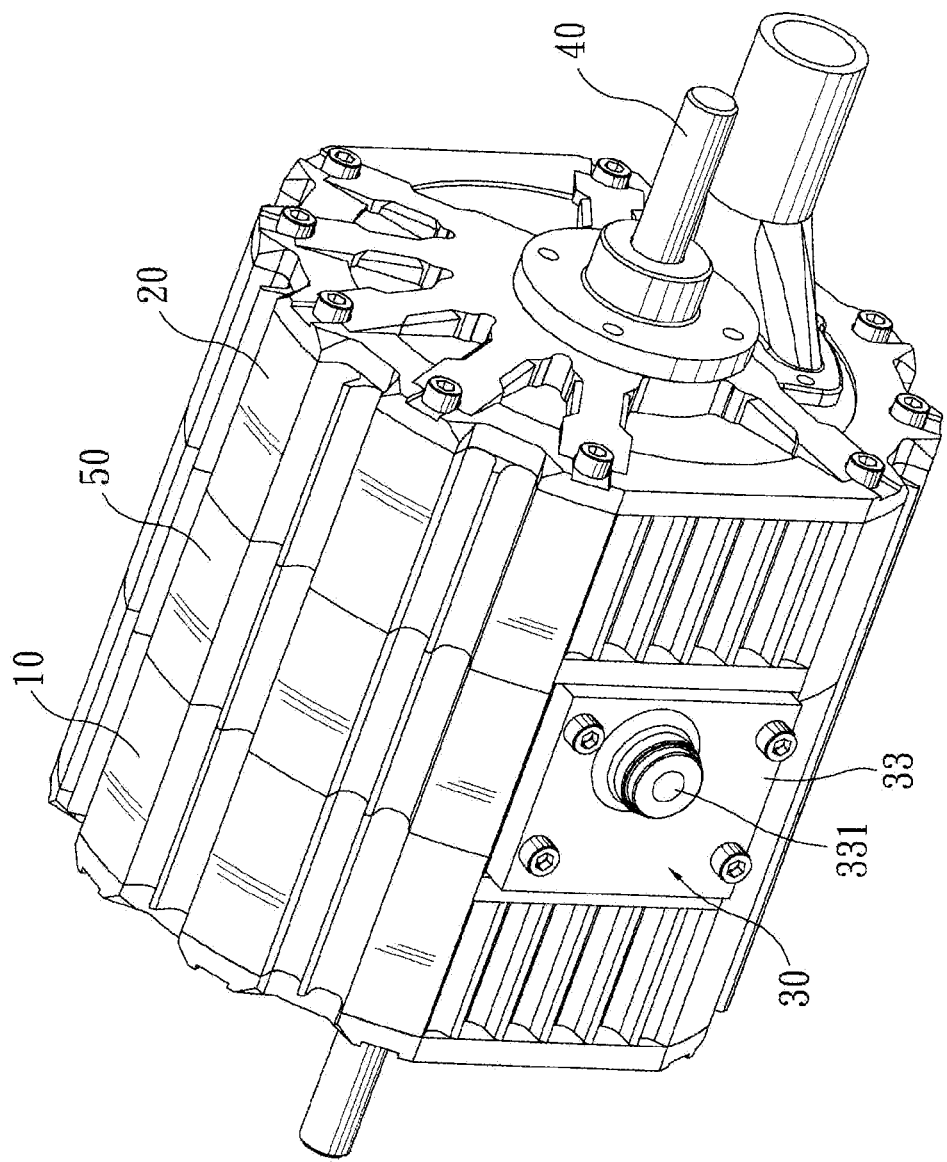
FIG. 1 is an assembled perspective view of a rotary engine with axially directly connected compression and power cylinders according to a preferred embodiment of the present invention.
Figure 2:
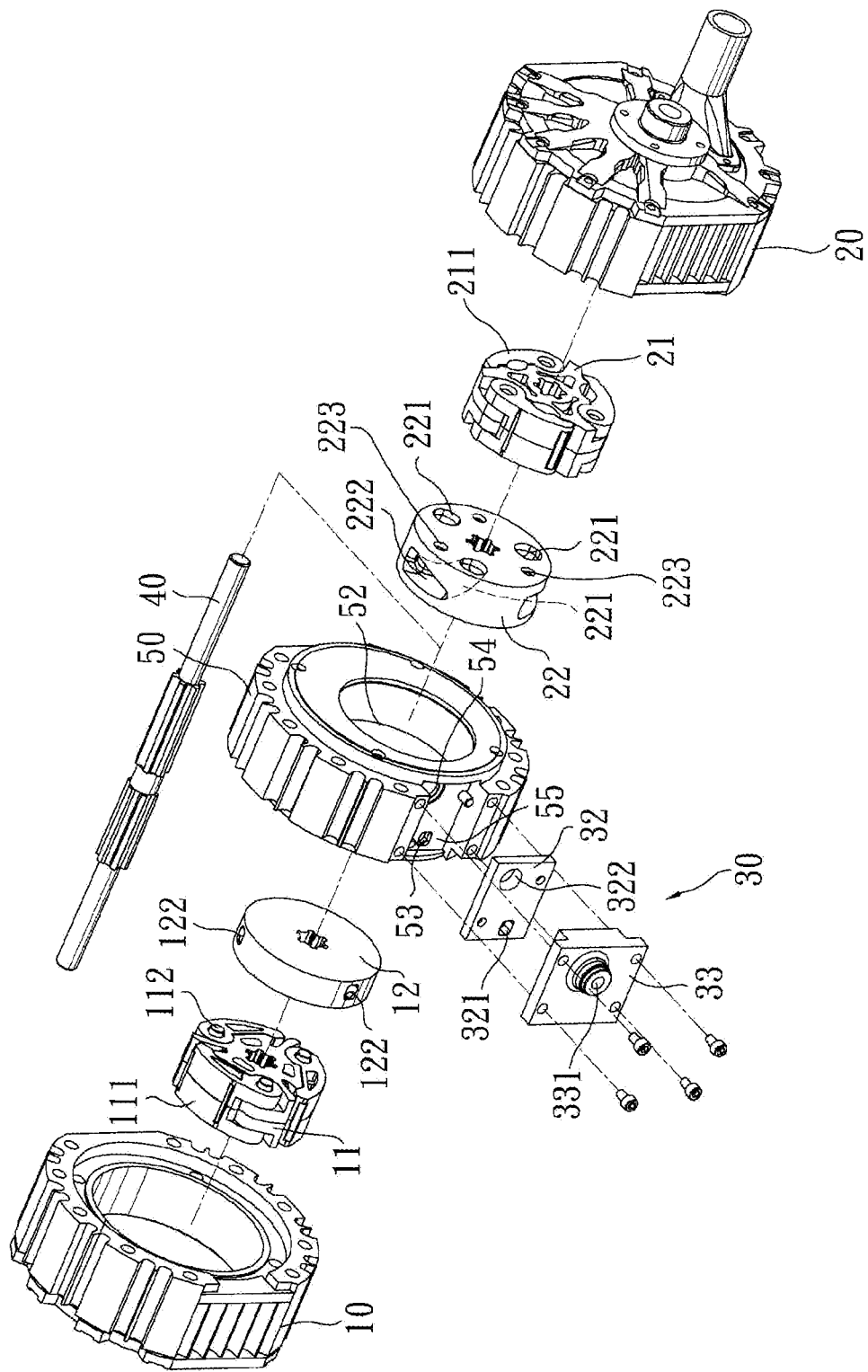
FIG. 2 is a right-end exploded view of FIG. 1.
Figure 3:
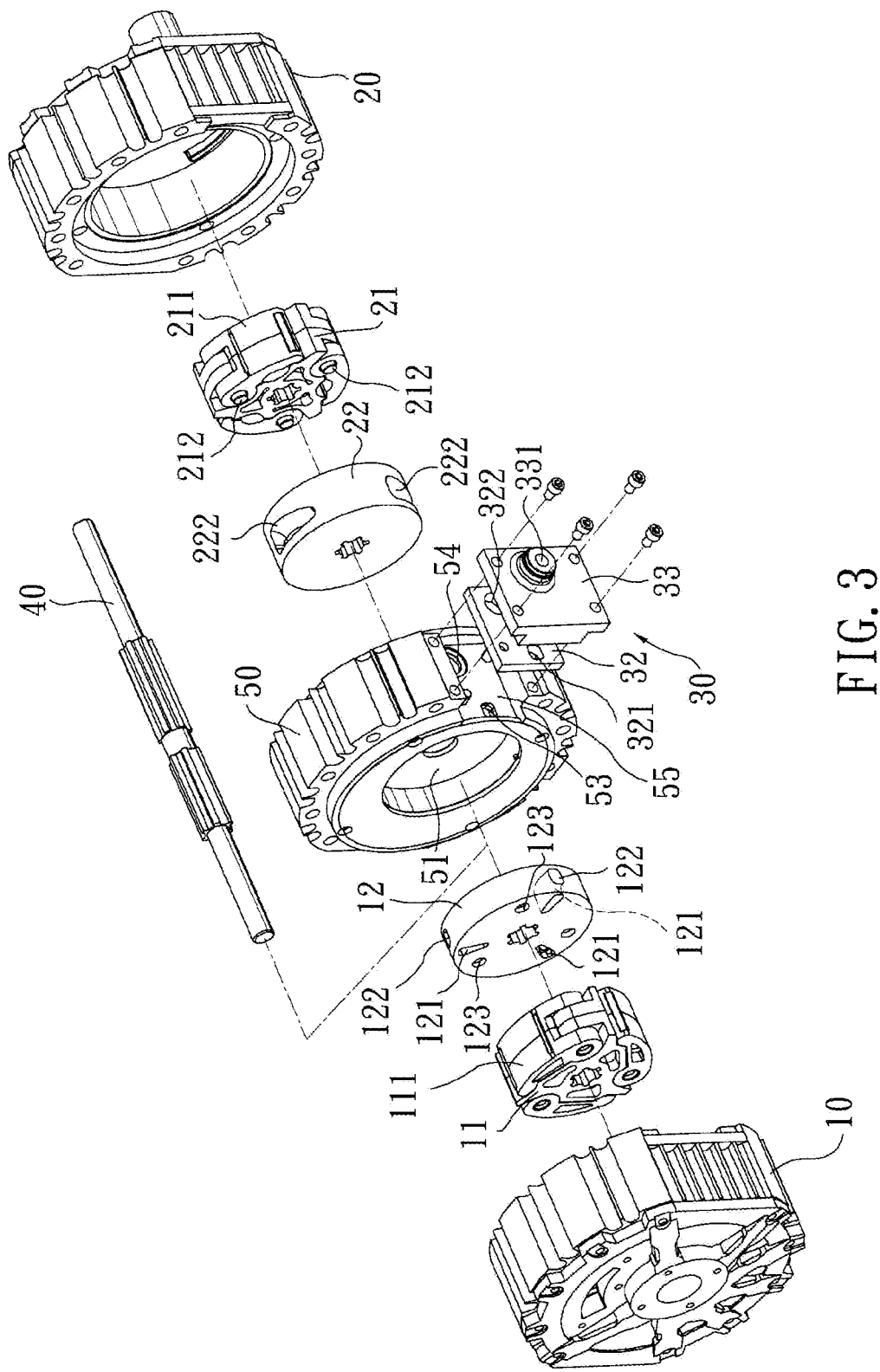
FIG. 3 is a left-end exploded view of FIG. 1.

Please refer to FIGS. 1 to 5. A rotary engine with axially directly connected compression and power cylinders according to a preferred embodiment of the present invention, which is also briefly referred to as the rotary engine herein for the purpose of conciseness and clarity, includes a compression cylinder 10, a power cylinder 20, and a combustion chamber unit 30. The compression cylinder 10 is internally provided with a compression rotor 11 having three blades 111; and the power cylinder 20 is internally provided with a power rotor 21 having three blades 211. The compression rotor 11 and the power rotor 21 rotate coaxially. The compression rotor 11 compresses an air-fuel mixture in the compression cylinder 10 and sends the compressed air-fuel mixture into the combustion chamber unit 30. In the combustion chamber unit 30, the compressed air-fuel mixture is ignited by a spark plug (not shown) to explode and generate high temperature high pressure gas. The high temperature high pressure gas is sent into the power cylinder 20 to push the power rotor 21 to rotate. A rotary shaft 40, on around which the compression and the power cylinder 10, 20 are fixedly mounted, rotates along with the power rotor 21. While the above-described structure is a typical structure of a rotary engine and has been disclosed in U.S. Pat. No. 6,082,324, it is not the technical features being claimed by the present invention.

The rotary engine according to the present invention emphasizes a simplified structure thereof that also enables an easy arrangement of cooling water passages in the rotary engine of the present invention. Please refer to FIGS. 2 and 3. The rotary engine of the present invention further includes an intermediate cylinder wall 50, which is located between the compression cylinder 10 and the power cylinder 20 to serve as a common inner-end wall of the compression cylinder 10 and the power cylinder 20. The intermediate cylinder wall 50 has a first circular recess 51 and a second circular recess 52 formed at two opposite end surfaces thereof. The first circular recess 51 communicates with the compression cylinder 10, and the second circular recess 52 communicates with the power cylinder 20. The first circular recess 51 is sized for fitly receiving a compression-side rotational valve 12 that rotates synchronously with the compression rotor 11; and the second circular recess 52 is sized for fitly receiving a power-side rotational valve 22 that rotates synchronously with the power rotor 21. The compression rotor 11 is provided on an axially inner end surface with three angularly spaced and axially protruded pins 112, and the compression-side rotational valve 12 is correspondingly provided on an axially outer end surface with three angularly spaced pin holes 123. The three protruded pins 112 are correspondingly engaged with the three pin holes 123, such that the compression rotor 11 and the compression-side rotational valve 12 rotate at the same time as an integral unit. The power rotor 21 is provided on an axially inner end surface with three angularly spaced and axially protruded pins 212, and the power-side rotational valve 22 is correspondingly provided on an axially outer end surface with three angularly spaced pin holes 223. The three protruded pins 212 are correspondingly engaged with the three pin holes 223, such that the power rotor 21 and the power-side rotational valve 22 rotate at the same time as an integral unit.

The compression-side rotational valve 12 is provided with three L-shaped first openings 121, which are located corresponding to the three blades 111 of the compression rotor 11 and respectively have an outlet 122 located on a circumferential wall of the compression-side rotational valve 12. The power-side rotational valve 22 is provided with three L-shaped second openings 221, which are located corresponding to the three blades 211 of the power rotor 21 and respectively have an outlet 222 located on a circumferential wall of the power-side rotational valve 22. The intermediate cylinder wall 50 is provided on a circumferential surface with a first through hole 53 and a second through hole 54. The first through hole 53 is located within a rotational orbit of the outlets 122 of the first openings 121. In other words, when the compression-side rotational valve 12 rotates, the outlets 122 of the three first openings 121 will sequentially and cyclically coincide with, and accordingly, communicate with the first through hole 53. The second through hole 54 is located within a rotational orbit of the outlets 222 of the second openings 221. In other words, when the power-side rotational valve 22 rotates, the outlets 222 of the three second openings 221 will sequentially and cyclically coincide with, and accordingly, communicate with the second through hole 54.

Figure 4:
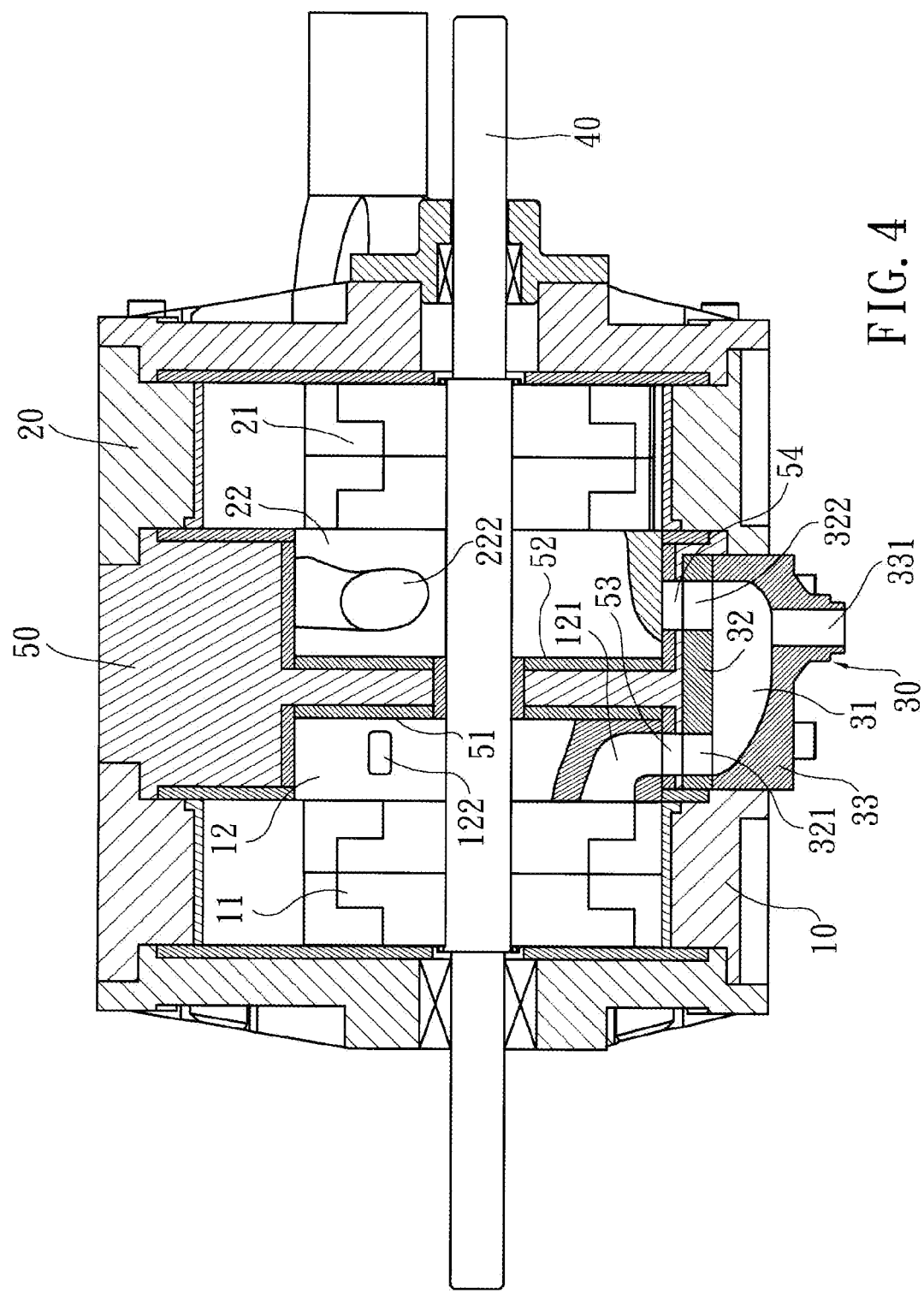
FIG. 4 is a sectional side view of the rotary engine shown in FIG. 1, showing a combustion chamber unit thereof in an intake state.
Figure 5:
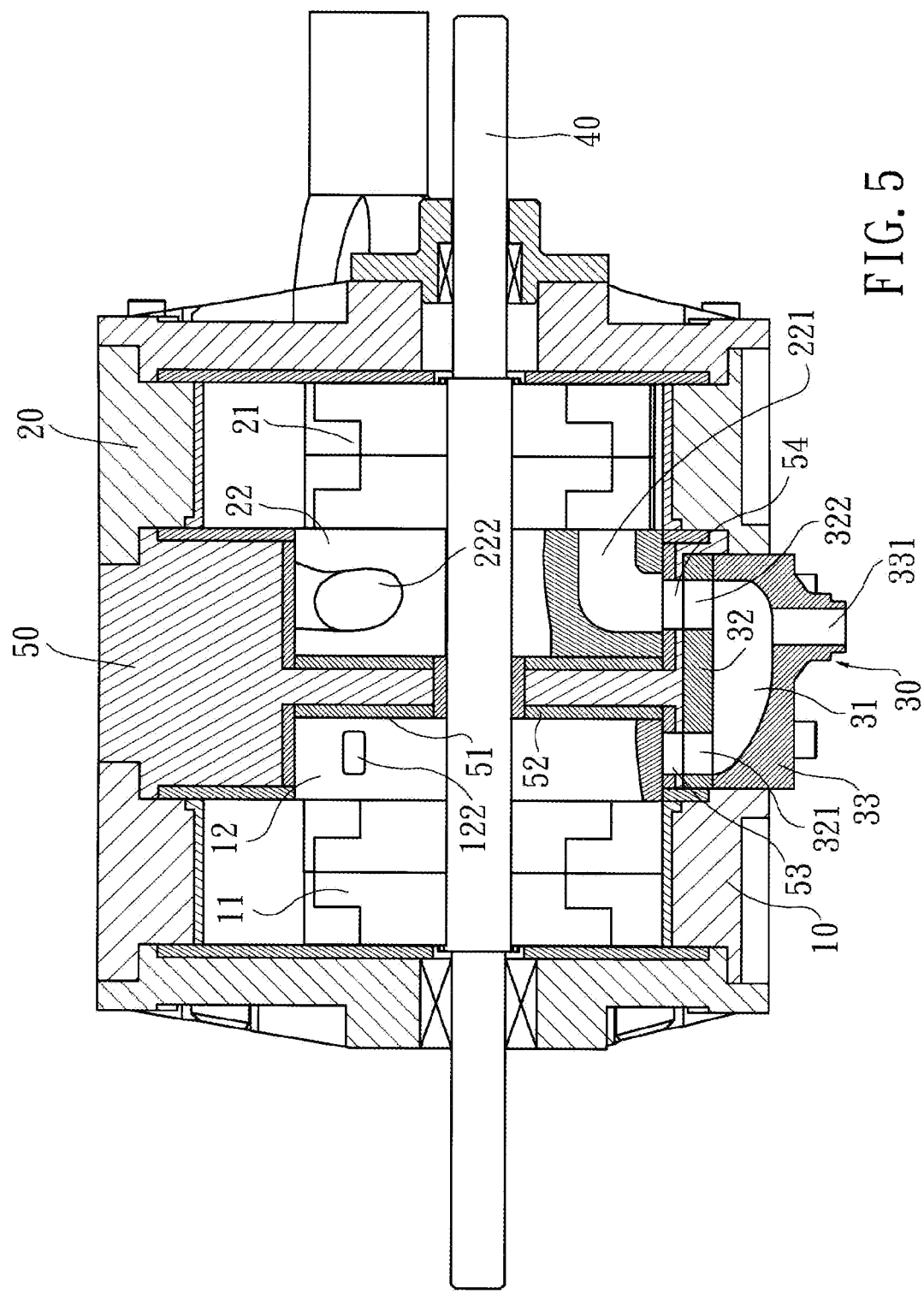
FIG. 5 is another sectional side view of the rotary engine shown in FIG. 1, showing the combustion chamber unit thereof in an explosion and exhaust state.

The combustion chamber unit 30 internally defines a hollow combustion chamber 31, and is fixedly connected to the intermediate cylinder wall 50. The combustion chamber 31 communicates with the first through hole 53 and the second through hole 54, such that the compressed air-fuel mixture in the compression cylinder 10 can sequentially flow through the aligned L-shaped first opening 121 and first through hole 53 into the combustion chamber 31, as shown in FIG. 4. Further, the high temperature high pressure gas in the combustion chamber 31 can sequentially flow through the aligned second through hole 54 and L-shaped second opening 221 into the power cylinder 20, as shown in FIG. 5.

The combustion chamber unit 30 includes a base 32 and a hood 33. The intermediate cylinder wall 50 is provided at one side of its circumferential surface with a recessed area 55, within which the first through hole 53 and the second through hole 54 are formed. The base 32 of the combustion chamber unit 30 is fixed to and located in the recessed area 55, and is provided with a third through hole 321 and a fourth through hole 322, which communicate with the first through hole 53 and the second through hole 54, respectively, of the intermediate cylinder wall 50. The hood 33 internally defines the combustion chamber 31, which has an open side facing toward the base 32. The hood 33 is fixedly connected to the intermediate cylinder wall 50 to cover the recessed area 55 and locate over the base 32 while tightly presses against the latter. The base 32 closes the open side of the combustion chamber 31 while the third and the fourth through hole 321, 322 are communicable with the combustion chamber 31. The hood 33 is provided with a spark plug mounting hole 331, into which a spark plug (not shown) can be fixedly mounted.

In the present invention, the provision of the intermediate cylinder wall 50 to serve as the common inner-end wall of the compression cylinder 10 and the power cylinder 20 can reduce an overall volume of the rotary engine. Further, in the present invention, the fixing of the combustion chamber unit 30 to the recessed area 55 on the circumferential surface of the intermediate cylinder wall 50 as well as the arrangement of the compression-side rotational vale 12 and the power-side rotational valve 22 in the first and the second circular recess 51, 52, respectively, of the intermediate cylinder wall 50 also reduces the overall volume of the compression cylinder 10 and the power cylinder 20. Moreover, the provision of the L-shaped first openings 121 on the compression-side rotational valve 12 can lower the pressure applied by the compressed air-fuel mixture to a front face of the compression-side rotational valve 12, and the provision of the L-shaped second openings 221 on the power-side rotational valve 22 can lower the pressure applied by the after-explosion high-pressure air-fuel mixture to a front face of the power-side rotational valve 22.

Further, in the present invention, the provision of the intermediate cylinder wall 50 as the common inner-end wall of the compression cylinder 10 and the power cylinder 20 enables an axially direct coupling of the compression cylinder 10 to the power cylinder 20. In other words, the compression cylinder 10 and the power cylinder 20 are directly connected to each other to form an integral body, which facilitates easy arrangement of cooling water passages in the rotary engine.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A rotary engine with axially directly connected compression and power cylinders, comprising a compression cylinder and a power cylinder; the compression cylinder being internally provided with a compression rotor having three blades, the power cylinder being internally provided with a power rotor having three blades, and the compression rotor and the power rotor rotating coaxially;
   characterized in that
   the rotary engine further comprises an intermediate cylinder wall and a combustion chamber unit;
       the intermediate cylinder wall being located between the compression cylinder and the power cylinder to serve as a common inner-end wall of the compression cylinder and the power cylinder, and having a first circular recess and a second circular recess formed at two opposite end surfaces thereof; the first circular recess communicating with the compression cylinder and being sized for fitly receiving a compression-side rotational valve that rotates synchronously with the compression rotor, and the second circular recess communicating with the power cylinder and being sized for fitly receiving a power-side rotational valve that rotates synchronously with the power rotor;
       the compression-side rotational valve being provided with three L-shaped first openings, which are located corresponding to the three blades of the compression rotor and respectively have an outlet located on a circumferential wall of the compression-side rotational valve, and the power-side rotational valve being provided with three L-shaped second openings, which are located corresponding to the three blades of the power rotor and respectively have an outlet located on a circumferential wall of the power-side rotational valve;
       the intermediate cylinder wall being provided on a circumferential surface with a first through hole and a second through hole; the first through hole being located within a rotational orbit of the outlets of the first openings, and the second through hole being located within a rotational orbit of the outlets of the second openings; and
       the combustion chamber unit internally defining a hollow combustion chamber and being fixedly connected to the circumferential surface of the intermediate cylinder wall; the combustion chamber communicating with the first through hole and the second through hole, such that compressed air-fuel mixture in the compression cylinder can sequentially flow through two aligned L-shaped first opening and first through hole into the combustion chamber and high temperature high pressure gas in the combustion chamber can sequentially flow through two aligned second through hole and L-shaped second opening into the power cylinder.

2. The rotary engine as claimed in claim 1, wherein the combustion chamber unit includes a base and a hood; the base being fixed to the circumferential surface of the intermediate cylinder wall and being provided with a third through hole and a fourth through hole, which communicate with the first through hole and the second through hole on the intermediate cylinder wall, respectively; and the hood internally defining the combustion chamber, which has an open side facing toward the base, and being fixedly connected to the intermediate cylinder wall to locate over and tightly press against the base; and the base closing the open side of the combustion chamber while the third and the fourth through hole on the base being communicable with the combustion chamber.

3. The rotary engine as claimed in claim 2, wherein the intermediate cylinder wall is provided at one side of the circumferential surface thereof with a recessed area, within which the first through hole and the second through hole are formed; and the base of the combustion chamber unit being fixed to and located in the recessed area with the third through hole and the fourth through hole on the base communicating with the first and the second through hole on the intermediate cylinder wall.

4. The rotary engine as claimed in claim 3, wherein the hood is provided with a spark plug mounting hole for fixedly holding a spark plug therein.

* * * * *